(No Model.) 2 Sheets—Sheet 1.

B. F. BROWN.
APPARATUS FOR SEALING ENVELOPES.

No. 342,821. Patented June 1, 1886.

Witnesses:
Walter E. Lombard
Frank E. Gray

Inventor:
Benjamin F. Brown,
by N. C. Lombard
Attorney.

N. PETERS, Photo-Lithographer, Washington, D. C.

(No Model.) 2 Sheets—Sheet 2.
B. F. BROWN.
APPARATUS FOR SEALING ENVELOPES.
No. 342,821. Patented June 1, 1886.
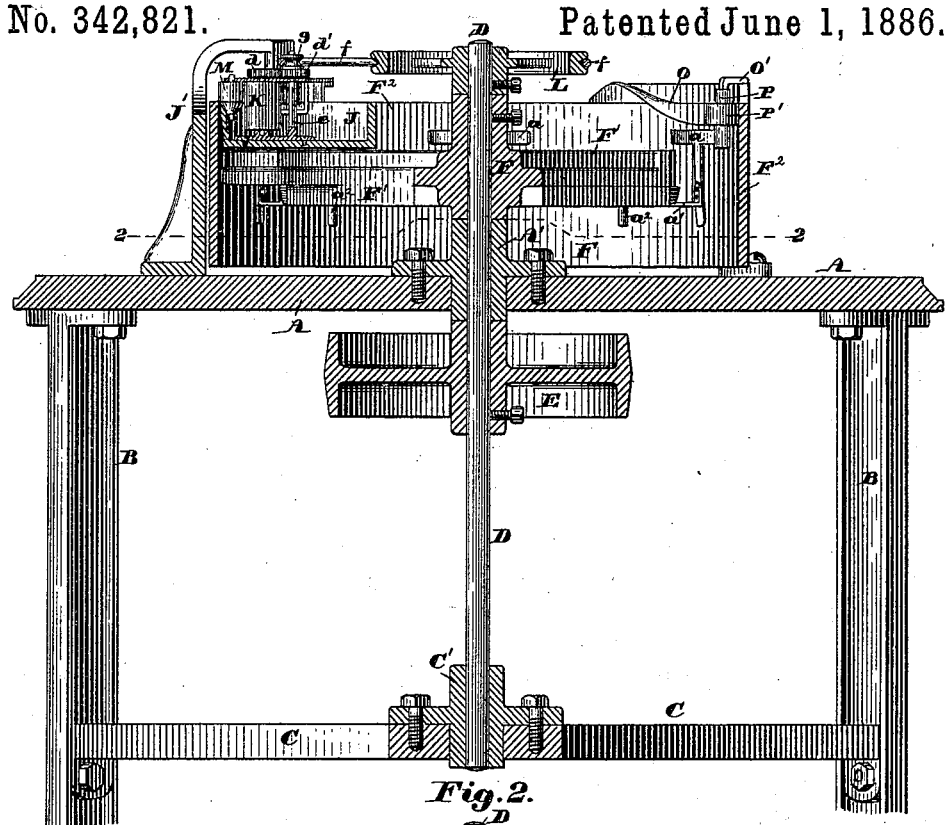
Fig. 2.
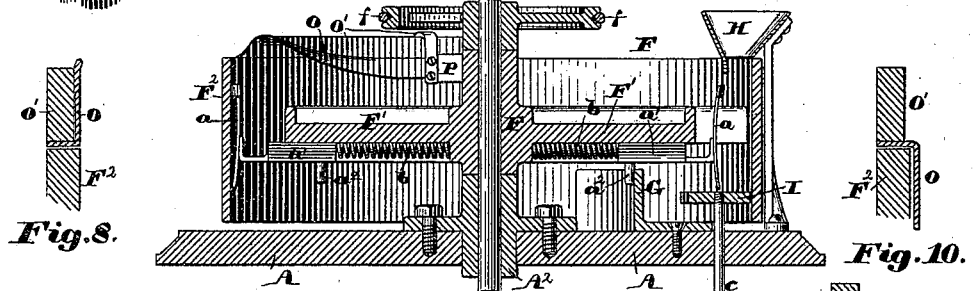
Fig. 8. Fig. 10.
Fig. 4. Fig. 9.
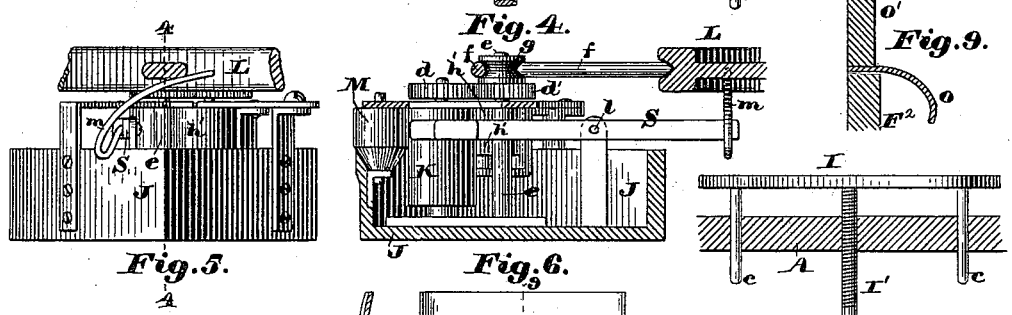
Fig. 5. Fig. 6. Fig. 7.
Fig. 12. Fig. 11.
Witnesses:
Walter E. Lombard.
Frank E. Bray.
Inventor:
Benjamin F. Brown,
by N. C. Lombard
Attorney.
N. PETERS, Photo-Lithographer, Washington, D. C.

UNITED STATES PATENT OFFICE.

BENJAMIN F. BROWN, OF MONTPELIER, VERMONT.

APPARATUS FOR SEALING ENVELOPES.

SPECIFICATION forming part of Letters Patent No. 342,821, dated June 1, 1886.

Application filed September 7, 1885. Serial No. 176,393. (No model.)

*To all whom it may concern:*

Be it known that I, BENJAMIN F. BROWN, of Montpelier, in the county of Washington and State of Vermont, have invented a new and useful Apparatus for Sealing Envelopes, of which the following, taken in connection with the accompanying drawings, is a specification.

It has become a very common practice in preparing certain articles for the market to place a certain given quantity in a paper envelope and seal the same. This is true of flower and garden seeds and a variety of powdered and granulated substances—notably drugs and medicines—and involves considerable labor, of which the sealing of the envelopes forms no inconsiderable part.

The object of my present invention is the production of an apparatus by which such envelopes, after being filled, may be automatically closed and sealed, whether the open flap of the envelope has been previously gummed or not; and it consists in certain novel constructions, arrangements, and combinations of devices, which will be readily understood by reference to the description of the drawings, and to the claims to be hereinafter given.

Figure 1:
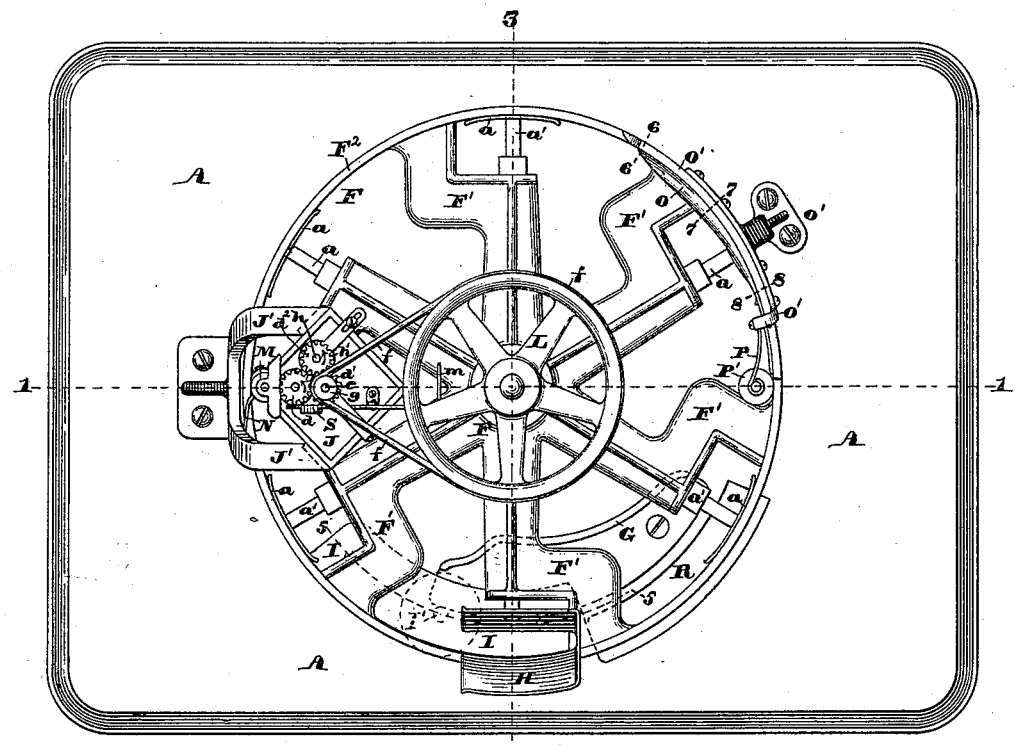
Figure 3:
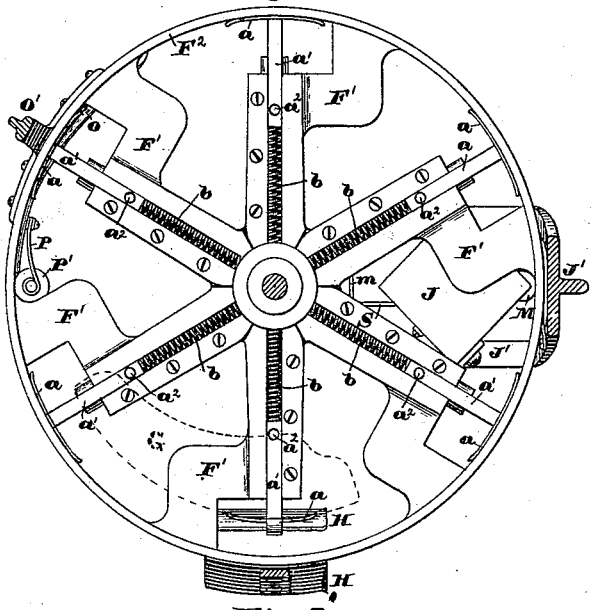

Figure 1 of the drawings is a plan of a machine embodying my invention. Fig. 2 is a vertical section on line 1 1 on Fig. 1. Fig. 3 is a horizontal section on line 2 2 on Fig. 2. Fig. 4 is a partial vertical section on line 3 3 on Fig. 1. Fig. 5 is an elevation of the gum or liquid containing tank and the mechanism for gumming or moistening the unfolded flap of the envelope, with a portion of the pulley for operating the same cut in section. Fig. 6 is a vertical section through said tank on line 4 4 on Fig. 5, and showing the gumming or moistening mechanism contained therein in elevation. Fig. 7 is a partial vertical section on line 5 5 on Fig. 1. Figs. 8, 9, and 10 are vertical transverse sections of the flap-turning device and a portion of the rim of the revolving drum, the cutting-planes being respectively on lines 6 6, 7 7, and 8 8 on Fig. 1; and Figs. 11 and 12 are respectively a front elevation and a vertical section of the spring-clamp, the cutting-plane of Fig. 12 being on line 9 9 on Fig. 11.

In the drawings, A is the table or bed of the machine, supported upon the legs B B, connected together by the tie-girt C, in which and the table A are formed or secured bearings C' and A', respectively, in which bearings is mounted the vertical shaft D, upon which are firmly secured the driving-pulley E and the drum F, as shown in Fig. 2. The drum F is provided with a series of crooked spokes, F' F', and has a rim, $F^2$, of a width or depth at least equal to the length of the longest envelope to be used when sealed, the inner face of which rim between the junctions of the spokes therewith being made smooth and parallel with the axis of the drum, as shown in Figs. 2 and 4. The under sides of the spokes F' must be located at a distance below the upper edge of the rim $F^2$ not greater than the length of the shortest envelope to be used, when sealed; and each spoke has formed in its under side a radial dovetailed groove or other bearing to receive the stem $a'$ of the spring-clamp $a$, arranged to be moved radially therein, the inward movement being caused by the action of the fixed cam G upon the pin $a^2$, projecting downward from the stem $a'$, and the outward movement being caused by the reaction of the spring $b$, all as shown in Figs. 3 and 4.

H is a stationary funnel-like guide, to assist in placing the envelopes in position, said funnel having but three sides, the side toward which the drum F revolves being left open for the free passage of the envelope therefrom.

I is a small supplementary table located beneath the funnel H and supported upon the screw I', by which it may be adjusted vertically to bring its upper surface at a distance from the top edge of the rim $F^2$ of the drum, equal to the length of the envelope to be sealed, minus the unfolded or extended flap, which must in all cases project above the upper edge of the rim $F^2$ of the drum F, said table I being held in place and guided in its up and down movements by the guide-rods $c\ c$, as shown in Fig. 7.

The upper portion of the spring-clamp $a$ is attached to the stem $a'$ in a fixed position, and is made T-shaped, the upper edge of the horizontal arm being below the upper edge of the rim $F^2$ of the drum F a distance somewhat greater than the width of the flap of the envelope to be turned down upon the body of the envelope. The lower portion of said spring-clamp, which may consist of a single straight arm, or may be in the shape of an inverted T, is adjustably secured to the stem $a'$ by means of the bolt $a^3$, which passes through the slot $a^4$, formed in said portion, and a hole in the stem $a'$, as shown in Figs. 11 and 12, for the purpose of adapting its lower end to bear upon the lower end of the envelope, regardless of the length of said envelope.

J is a tank suspended just above the spokes of the drum F and within its rim, from the standard J', as shown in Figs. 1 and 2. Within the tank J is mounted in suitable bearings supported thereby the paste or liquid receiving roll K, with its axis vertical and projecting some distance above the top edge of said tank, and its lower end extending down to or into paste or liquid in said tank, as shown in Figs. 2 and 6. Upon the upper end of the shaft of the roll K is secured the spur gear-wheel $d$, which meshes into and is revolved by the gear-wheel $d'$, mounted upon the shaft $e$, to which rotary motion is imparted by means of the pulley L, secured to the upper end of the shaft D, and the belt $f$, leading therefrom to and around the pulley $g$, secured to the upper end of the shaft $e$, as shown in Figs. 1, 2, and 6. The gear-wheel $d'$ also meshes into and imparts motion to the gear-wheel $d^2$ upon the upper end of the shaft $h$, which also carries the short distributing-roll $h'$, arranged to roll in contact with the upper portion of the roll K, but in the opposite direction thereto. A third roll, M, is mounted in bearings supported by the tank J, so as to revolve in contact with the upper portion of the roll K, its lower end being made conical and extending into the tank, as shown in Figs. 2 and 6, so that any surplus paste or gum which may tend to fall from said roll will be guided into the tank, instead of falling outside of it. The roll M is revolved by frictional contact with the roll K in a well-known manner, and serves to take gum, paste, or other liquid from said roll K and deposit it upon the unfolded flaps of the envelopes as they are carried into contact with and past it by the revolution of the drum F.

N is a spring attached at one end to the standard J', with its free end extending toward the roll M in the direction of the revolution of the drum F, but not quite touching said roll, said end in its normal position being just within the plane of the inner surface of the rim $F^2$ of the drum, but entirely above the upper edge of said drum, as shown in Fig. 1.

O is the folding device, made, preferably, of metal, and having its inner surface curved to somewhat resemble a plowshare and supported by the standard O' in a position partly above and partly within the rim of the drum F, as shown in Figs. 1, 2, 3, 4, 8, 9, and 10. This device serves to turn the unturned flap of the envelope gradually down upon the body of the envelope as the drum F, with the envelope clamped thereto, revolves past or through the same.

P is a spring, preferably provided in its free end with the roll P', which, in connection with the rim of the drum, serves to press the just-folded flap hard upon the body of the envelope, so as to insure its adhering thereto. The roll P' may be dispensed with by so shaping the spring P that its free end may press upon the envelope; but I prefer to use the roll, as being less liable to displace or injure the flap of the envelope.

As the drum F revolves after the envelope leaves the fold-pressing device, the pin $a^2$ in the under side of the stem $a'$ comes into contact with the cam G, and the stem $a'$ and the spring-clamp $a$ are moved toward the axis of said drum, thereby releasing the envelope, which drops through the opening R in the table A upon the floor, or into any receptacle provided for the purpose.

It will be observed that only the roll K revolves in the paste, gum, or other liquid contained in the tank J, and only the lower portion of said roll, for the reason that the upper portion of the roll K and nearly the whole of the rolls $h'$ and M are above the top of said tank, and as the paste, gum, or other liquid contained in the tank is to be applied to the flap of the envelope at a point above the top edge of the tank, it follows that some sort of a rising and falling device must be used to raise the paste, gum, or other liquid to the upper portion of the roll K, where it will be distributed evenly over its surface by the roll $h'$, and from which it may be taken by the roll M and deposited upon the inner surface of the unfolded flap of the envelope. This may be done by means of the well-known reciprocating and revolving roll; but I have shown a simple lever, S, pivoted at $l$ upon a standard supported by said tank, about which pivot it is made to vibrate in a plane parallel with the axis of the roll K, with its outer end in close proximity to or in contact with the periphery of said roll, by the revolution of the pulley L, the spokes of which successively come in contact with and depress the curved arm $m$, secured to and extending at right angles from the inner end of said lever S, as shown in Figs. 5 and 6, the outer end of said lever being weighted, so as to cause it to fall as soon as an arm of the pulley leaves the curved arm or cam $m$, all as shown in Figs. 1, 5, and 6.

The weighted end of the lever S, when used with water in the tank for moistening the flaps of gummed envelopes, should have secured thereto a piece of sponge, felt, or other absorbent material, to insure the raising of the liquid to and depositing of it upon the upper portion of the roll K, from which it is to be transferred by the roll M to the flap of the envelope.

The operation of my invention is as follows: Power being applied to the shaft D to revolve it, either continuously or intermittently, an envelope is placed in the funnel H just as one of the spokes F' has passed from beneath said funnel and another is approaching it, said envelope being deposited upon the adjustable table I, with its open end upward, and as the drum continues to revolve, the edge of the approaching spoke, acting as a shoulder, comes in contact with the edge of the envelope, and carries it bodily along with it, its lower end sliding along on the table I till the pin $a^2$ leaves the cam G, when the reaction of the spring $b$ moves the spring-clamp $a$ into contact with the envelope and presses it into a perpendicular position and firmly against the inner surface of the rim $F^2$ of the drum, where it is firmly held with the unfolded flap thereof projecting above the upper edge of said rim. As the revolution of the drum continues, the flap of the envelope is carried between the roll M and the spring N, and has paste or gum or, if the flap has been previously gummed, water applied to its inner face, and the envelope is then carried, still clamped to the drum, through the plowshare-like turning device O, and beneath the spring pressing device P P', when the envelope is firmly sealed, and by the pin $a^2$, coming into engagement with the cam G, the spring-clamp is removed from contact with the envelope, and it drops through the hole R in the table A, as before described.

The envelopes may be supplied to the funnel H by the hand of the attendant, or automatically in any well-known manner, and particularly by the package-filling machine patented to Joseph C. Brown, June 9, 1885, No. 319,672.

The spring-clamp must be so constructed that in case the envelope, when it is deposited in the funnel or hopper H, falls upon the table I in an inclined position—that is, with its bottom farther from the rim of the drum than its upper end—said clamp, by striking the lower end of the envelope first, will right it, or move said envelope into a perpendicular position before clamping it to the rim of the drum, it being important that the desired line of fold of the unfolded flap of the envelope should coincide with the upper edge of the rim of the drum when it is clamped thereto.

What I claim as new, and desire to secure by Letters Patent of the United States, is—

1. An organized machine for sealing envelopes, containing, essentially, the following elements, viz: a revolving drum, a spring-clamp mounted upon and revolving with said drum, for clamping the envelope to the inner face of the rim of said drum, a stationary paste or liquid containing receptacle, mechanism for transferring paste, gum, or other liquid from said receptacle to the inner face of the unfolded flap of the envelope, a stationary flap-turning device, and a fixed cam for retracting said spring-clamp to release the envelope, all arranged and adapted to operate substantially as and for the purposes described.

2. In combination with the revolving drum, a radially-reciprocating spring-clamp for clamping the envelope to the inner periphery of said drum, a fixed cam for moving said clamp in one direction, and a spring for moving it in the opposite direction, substantially as and for the purposes described.

3. In combination with the revolving drum, a vertically-adjustable table for registering the position of the envelope vertically relative to the upper edge of the rim of said drum, a spring-clamp for clamping the envelope to said rim, a fixed cam for moving said clamp in one direction, and a spring for moving it in the opposite direction, substantially as described.

4. The combination of a fixed paste or liquid tank, a paste or liquid receiving roll, a distributing-roll, and a paste or liquid applying roll, all located over or above said tank, with their axes perpendicular thereto, and a device constructed and arranged to move into and out of the paste or other liquid and along and in close proximity to the periphery of said paste or liquid receiving roll, and deposit the paste or liquid taken up along the whole length of said roll.

5. In combination with the revolving drum and a spring-clamp for clamping the envelope to the rim of said drum, a fixed plowshare-like folding device supported upon a stand above the upper edge of the rim of said drum, and projecting upward from and outside of the inner face of said rim at one end, and gradually turned inward and downward until at its other end it projects downward within and parallel to the inner face of said rim, substantially as and for the purposes described.

6. The combination of the drum F, the spring-clamp $a$, the folding spiral or plowshare O, and a spring-presser for forcing the newly-folded flap into firm contact with the body of the envelope.

7. The spring-clamp $a$, composed of an upper T-shaped portion secured permanently to the stem $a'$, and a lower portion provided with a vertical slot and secured to the stem $a'$ by the bolt $a^3$, so as to be adjustable vertically thereon, substantially as described.

8. The combination of the revolving drum F, the adjustable table I, the clamp $a$, and the fixed funnel H, all arranged and adapted to operate substantially as and for the purposes described.

9. The combination of a revolving drum provided with a radial surface or shoulder to engage with the vertical edge of the envelope and register its position relative to the circumference of the rim of the drum, an adjustable table to receive the envelope and register its position vertically, and a spring-clamp for clamping the envelope to the rim of the drum, substantially as described.

10. In combination with a revolving drum and a clamp for securing the envelope to the rim of the drum, the roll M, having its lower portion made in the form of an inverted frustum of a cone, and the tank J, located with and in close proximity to the rim of said drum, and inclosing the greater part of the conical portion of said roll, whereby the upper portion of said roll M may project beyond the outermost part of said tank to a point vertically above the inner periphery of the rim of said drum, and the conical portion of said roll may serve to guide any surplus paste or liquid on said roll into the tank, substantially as described.

In testimony whereof I have signed my name to this specification, in the presence of two subscribing witnesses, on this 28th day of August, A. D. 1885.

BENJ. F. BROWN.

Witnesses:
WALTER E. LOMBARD,
FRANK E. BRAY.